United States Patent
Boday et al.

(10) Patent No.: US 9,656,239 B2
(45) Date of Patent: May 23, 2017

(54) APPARATUS FOR CONTROLLING METALS IN LIQUIDS

(71) Applicant: International Business Machines Corporation, Armonk, NY (US)

(72) Inventors: Dylan J. Boday, Tucson, AZ (US); Jeannette M. Garcia, San Jose, CA (US); James L. Hedrick, Pleasanton, CA (US); Rudy J. Wojtecki, San Jose, CA (US); Gavin O. Jones, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 93 days.

(21) Appl. No.: 14/305,625

(22) Filed: Jun. 16, 2014

(65) Prior Publication Data

US 2015/0360205 A1 Dec. 17, 2015

(51) Int. Cl.
| | |
|---|---|
| *C02F 1/28* | (2006.01) |
| *B01D 15/00* | (2006.01) |
| *B01J 20/26* | (2006.01) |
| *C08G 73/06* | (2006.01) |
| *C08F 26/06* | (2006.01) |

(Continued)

(52) U.S. Cl.
CPC .......... *B01J 20/262* (2013.01); *B01D 15/08* (2013.01); *C02F 1/285* (2013.01); *C02F 2101/20* (2013.01); *C02F 2201/002* (2013.01); *C02F 2303/16* (2013.01)

(58) Field of Classification Search
CPC C08G 73/06; C08G 73/0638; C08G 73/0644; C08G 73/065; C08G 73/02; C08G 73/0273; C08G 73/08; C08G 12/08; C08F 283/00; C08F 26/00–26/06; C08F 126/00–126/06; C08F 226/00–226/06; C08F 16/34; C08F 116/34; C08F 216/34
See application file for complete search history.

(56) References Cited

U.S. PATENT DOCUMENTS

| | | | |
|---|---|---|---|
| 2,889,277 | A | 6/1959 | Hughes |
| 3,340,232 | A | 9/1967 | Smith et al. |

(Continued)

FOREIGN PATENT DOCUMENTS

| | | |
|---|---|---|
| CN | 101265255 A | 9/2008 |
| CN | 101270095 A | 9/2008 |

(Continued)

OTHER PUBLICATIONS

Garcia, JM et al., "Recyclable, Strong Termosets and Organogels via Paraformaldehyde Condensation with Diamines". Scince. May 16, 2014; Abstract, Figure 1B, p. 732, first-third paragraphs.

(Continued)

*Primary Examiner* — Nam Nguyen
*Assistant Examiner* — Clare Perrin
(74) *Attorney, Agent, or Firm* — Patterson & Sheridan, LLP (57) ABSTRACT

Method and apparatus for controlling metals in a liquid are described. The liquid is contacted with a hexahydrotriazine and/or a hemiaminal material, and metal is adsorbed from the liquid onto the material. The hexahydrotriazine and/or hemiaminal material may be made from a diamine and an aldehyde.

3 Claims, 4 Drawing Sheets (51) Int. Cl.

| | | |
|---|---|---|
| *C08F 226/06* | (2006.01) | |
| *C08F 16/34* | (2006.01) | |
| *C08F 216/34* | (2006.01) | |
| *C08G 73/02* | (2006.01) | |
| *B01D 15/08* | (2006.01) | |
| *C02F 1/42* | (2006.01) | |
| *B01J 39/00* | (2006.01) | |
| *B01J 49/00* | (2006.01) | |
| *C08G 73/00* | (2006.01) | |
| *C08F 283/00* | (2006.01) | |
| *B01J 20/22* | (2006.01) | |
| *C02F 101/20* | (2006.01) | |

(56) References Cited

U.S. PATENT DOCUMENTS

| | | | |
|---|---|---|---|
| 3,598,748 | A | 8/1971 | Hirosawa et al. |
| 3,957,742 | A | 5/1976 | Kveton |
| 3,969,244 | A * | 7/1976 | Kobayashi ............... B01J 20/22 210/688 |
| 4,106,904 | A | 8/1978 | Oude Alink et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,446,056 | A | 5/1984 | Thompson |
| 4,486,391 | A * | 12/1984 | Hashimoto ............... C01F 5/30 210/638 |
| 4,576,973 | A | 3/1986 | Keil et al. |
| 4,877,451 | A | 10/1989 | Winnik et al. |
| 5,112,796 | A | 5/1992 | Iannicelli |
| 5,185,083 | A | 2/1993 | Smigo et al. |
| 5,674,377 | A | 10/1997 | Sullivan, III et al. |
| 5,830,243 | A | 11/1998 | Wolak et al. |
| 5,863,879 | A | 1/1999 | Zirnstein et al. |
| 7,384,434 | B2 | 6/2008 | Malfer et al. |
| 9,120,897 | B1 | 9/2015 | Boday et al. |
| 9,120,899 | B1 | 9/2015 | Boday et al. |
| 2001/0046994 | A1 | 11/2001 | Wu et al. |
| 2008/0305047 | A1 | 12/2008 | Raymo et al. |
| 2009/0039018 | A1* | 2/2009 | Jordi ............... B01J 20/26 210/635 |
| 2009/0057232 | A1 | 3/2009 | Angeles-Boza et al. |
| 2009/0258429 | A1 | 10/2009 | Raymo et al. |
| 2009/0277791 | A1 | 11/2009 | Vu et al. |
| 2010/0107476 | A1 | 5/2010 | Cosimbescu |
| 2011/0061495 | A1* | 3/2011 | Yamashita ............... B01J 20/26 75/330 |
| 2011/0108493 | A1 | 5/2011 | Yin et al. |
| 2011/0243819 | A1 | 10/2011 | Zinn et al. |
| 2012/0046191 | A1 | 2/2012 | Vu et al. |
| 2012/0049308 | A1 | 3/2012 | Nishimura et al. |
| 2012/0211439 | A1 | 8/2012 | Pears et al. |
| 2013/0264209 | A1 | 10/2013 | Kwon et al. |
| 2015/0343352 | A1 | 12/2015 | Boday et al. |
| 2015/0343421 | A1 | 12/2015 | Boday et al. |
| 2015/0355156 | A1 | 12/2015 | Boday et al. |
| 2015/0376451 | A1 | 12/2015 | Boday et al. |

FOREIGN PATENT DOCUMENTS

| | | |
|---|---|---|
| EP | 0928966 A1 | 7/1999 |
| EP | 0851287 B1 | 3/2002 |
| EP | 2636697 A1 | 9/2013 |
| GB | 928112 A | 6/1963 |
| GB | 1531578 A | 11/1978 |
| WO | 9607660 A1 | 3/1996 |
| WO | 0166614 A2 | 9/2001 |
| WO | 0198388 A1 | 12/2001 |
| WO | 0226849 A1 | 4/2002 |
| WO | 2015051715 A1 | 4/2015 |
| WO | 2015187980 A1 | 12/2015 |
| WO | 2015187985 A1 | 12/2015 |

OTHER PUBLICATIONS

International Search Report and Written Opinion dated Sep. 14, 2015 for Applictation No. PCT/US2015/034534.
International Search Report and Written Opinion dated Sep. 8, 2015 for Applictation No. PCT/US2015/034512.
Wang Yulan and Lu Fengcai, Synthesis and Properties of Polu-1,3,5-Triazines, Polymer Communications, 1984, 7 pages, No. 2, Institute of Chemistry, Academia Sinica, Bejing.
Margit Hiller and Sergey E. Evsyukov, Laser-Engravable Hexahydrotriazine Polmer Networks, Published Online, Aug. 16, 2002.
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
Hydrogen Sulfide Management, Mitigation options in petroleum refining, storage and transportation, White Paper, Baker Hughes, pp. 1-12.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.
Ferrar, "Reactions of Formaldehyde With Aromatic Amines," J. Appl. Chem, 14, 1964, 389-399.
Geng, et al., "Nanoindentation behavior of ultrathin polymeric films," Polymer 46 (2005) 11768-11772; Available online Oct. 19, 2005.
Oliver, et al. "Measurement of hardness and elastic modulus by; instrumented indentation: Advances in understanding and; refinements to methodology," J. Mater. Res., vol. 19, No. 1, Jan 2004, 3-20.
Singh, et al., "Ultrasound mediated Green Synthesis of Hexa-hydro Triazines," J. Mater. Environ. Sci. 2 (4) (2011) 403-406.
Stafford, et al., "A buckling-based metrology for measuring; the elastic moduli of polymeric thin films," Nature Materials_3_ AUGUST 2004, 545-550;Published online: Jul. 11, 2004.
List of IBM patents or Patent Applications Treated as Related.
Jones et al. "Computational and Experimental Studies on the Mechanism of Formation of Poly (hexahydrotriazine)s and Poly(hemiaminal)s from Reactions of Amines with Formaldehyde." Organic Letters (online), Oct. 8, 2014, vol. 16, Issue 20, pp. 5502-5505. Internet: http://pubs.acs.org/doi/abs/10.1021/ol50284k (abstract).
Wojtecki et al. "Development of a method for detecting trace metals in aqueous solutions based on the coordination chemistry of hexahydrotriazines." Analyst (online), Jun. 2, 2015, vol. 140, Issue 15, pp. 5184-5189. Internet: http://www.ncbi.nlm.nih.gov/pubmed/26035633 (abstract).

(56) References Cited

OTHER PUBLICATIONS

Lupulescu A I, In Situ Imaging of Silicalite-1 Surface Growth Reveals the Mechanism of Crystallization, Science, 20140516 American Association for the Advancement of Science, US, vol. 344, Nr: 6185, pp. 729-732.
PCT/US2015/034258, The International Search Report, dated Aug. 26, 2015.

* cited by examiner

APPARATUS FOR CONTROLLING METALS IN LIQUIDS

BACKGROUND

The present disclosure relates to metal sequestration in fluids, and more specifically, to use of hexahydrotriazine and hemiaminal molecules, oligomers, and polymers derived from aromatic, aliphatic, and/or polyether diamines to sequester and/or remove metals from liquids.

Many commercially important processes exist to remove metals from liquids. Metals are routinely removed from water for drinking, for purification of groundwater, and for remediation of toxic sites. Metals are also removed from other liquids, such as polar and non-polar organic liquids. Removing trace metals often requires costly additives and instrumentation. There is a need in the art for a sensitive cost-effective way to remove trace metals from liquids.

SUMMARY

According to one embodiment of the present disclosure, a method includes exposing a liquid containing metal to a HA or HT metal control material; adsorbing metal from the liquid onto the metal control material; and removing the metal from the liquid by separating the metal control material from the liquid. The metal control material may be a reaction product of an aldehyde and a primary diamine.

According to another embodiment, an apparatus includes a housing; a metal control material comprising an HA material or an HT material disposed in the housing; a connection structure coupled to the housing; and a support disposed in the housing and supporting the metal control material.

DETAILED DESCRIPTION

Hexahydrotriazine (HT) materials and hemiaminal (HA) materials derived from aromatic, aliphatic, and/or polyether diamines may be used as a metal control material to sequester or remove metals from a liquid. The metal control materials may be single molecule species, oligomers, and/or polymers (i.e., polyhexahydrotriazine, PHT, polyhemiaminal, PHA). The metal control materials may be made using an aromatic diamine, a polyether diamine, or a mixture thereof to react with a formaldehyde (i.e. formaldehyde or paraformaldehyde). Other methods of making such materials include reacting amines with chloromethyl ether. Such metal control materials will form a complex with metal ions in a liquid, partially or completely sequestering or removing the metal from the liquid to the metal control material. After loading with metal, the metal control material may be removed, or otherwise separated, from the liquid leaving a reduced metal content in the liquid. Possible metal which may be removed from the liquid may be, without limitation, silver, zinc, lithium, calcium, and europium.

Figure 1A:
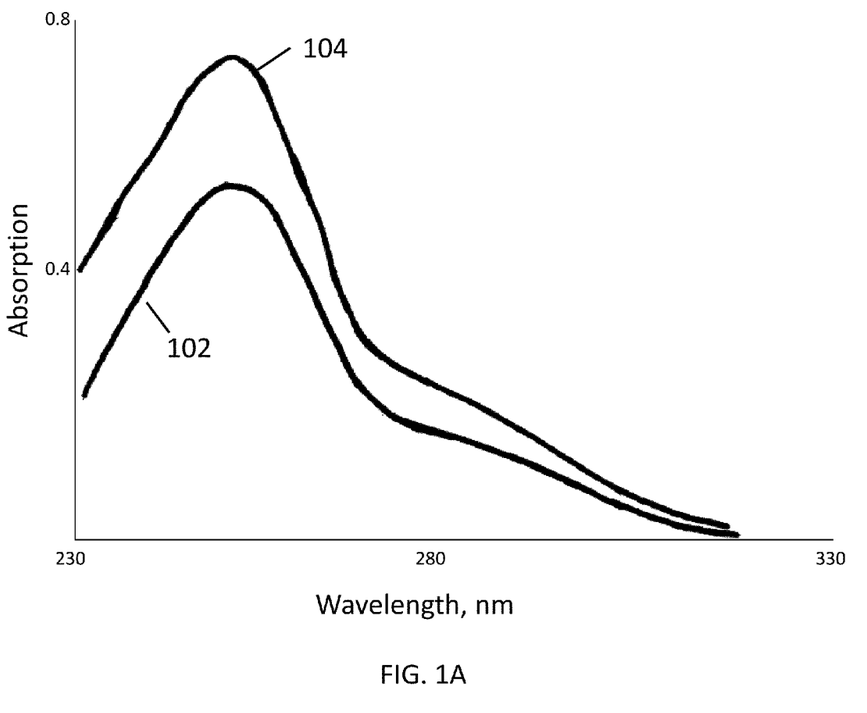
FIG. 1A is a UV spectrograph of a metal control material before and after exposure to metal according to one embodiment.
Figure 1B:
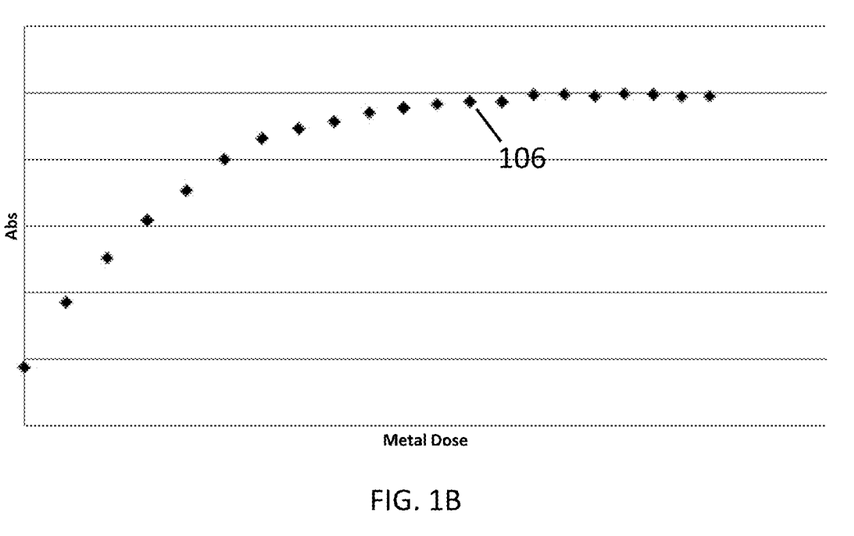
FIG. 1B is a graph showing the effect of increasing lithium dose on UV absorption absorption of a metal control material according to another embodiment.

FIG. 1A is a UV spectrograph of an exemplary metal control material before and after exposure to metal ions according to one embodiment. The UV absorption spectrum of the metal control material before exposure to metal ions is at 102, and the UV absorption spectrum of the same material after exposure to metal ions is at 104. FIG. 1A is representative of the effect of various metals on various different kinds of HT and HA materials. As metal dosing of the HT or HA material increases, UV absorption of the material changes, indicating metal is being sequestered from the liquid by the removal material. In the embodiment of FIG. 1A, the effect of exposing an HT material, 1,3,5-triphenyl-1,3,5-triazinane, to a solution of lithium trifluoromethanesulfonate (also known as "triflate") in 80% acetonitrile, with the balance dichloromethane, on the UV absorption spectrum of the HT material is shown. FIG. 1B is a graph showing the effect of increasing dosage of lithium in the mixture above. The data 106 shows monotonically increasing absorption at a wavelength of 251.3 nm with increasing metal dose, indicating increasing load of metal in the removal material. A saturation effect with respect to metal dose is evident in FIG. 1B.

Figure 2:
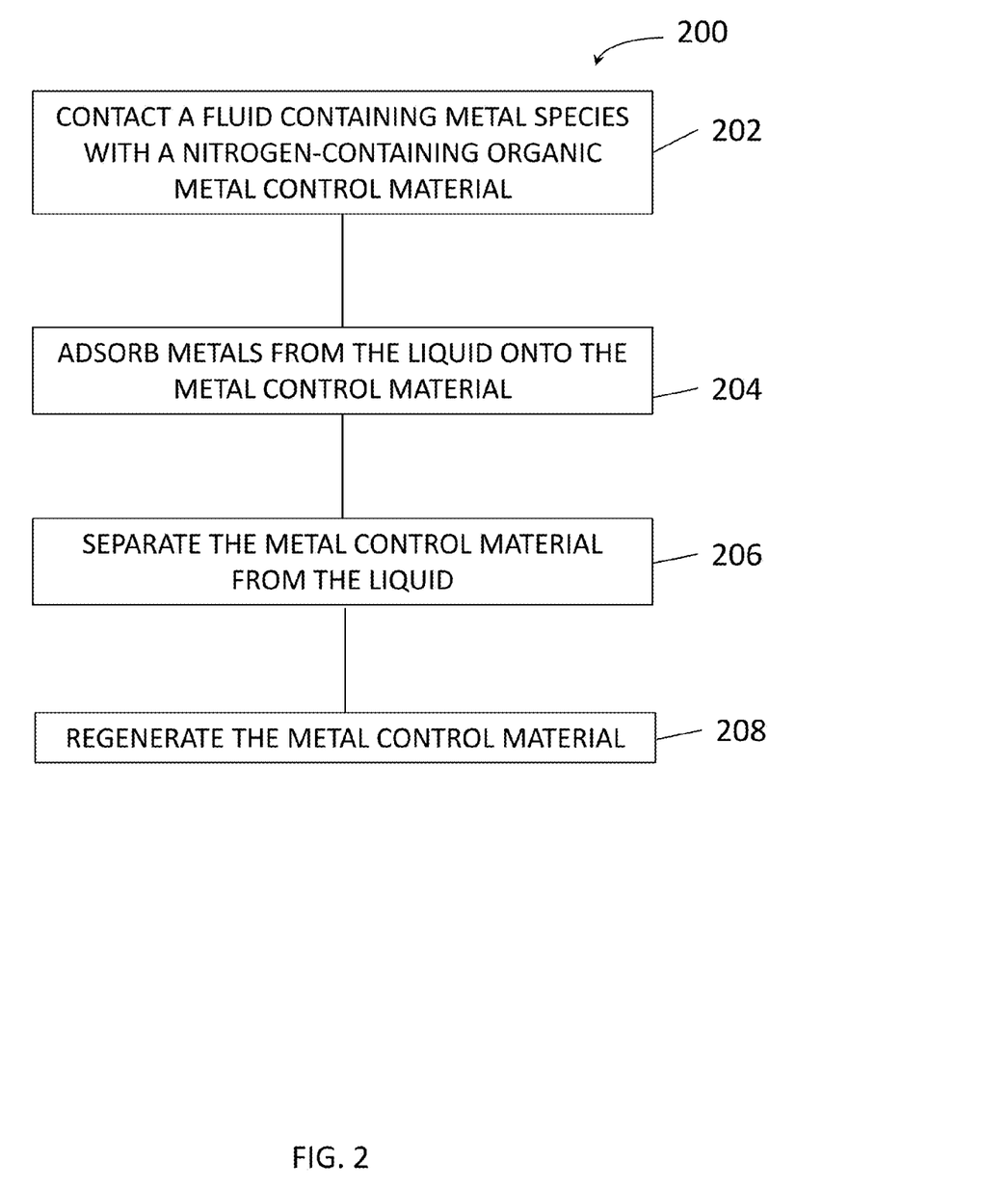
FIG. 2 is a flow diagram summarizing a method of removing metals from a liquid according to one embodiment.

FIG. 2 is a flow diagram summarizing a method 200 of removing metal from a liquid according to another embodiment. The method 200 involves using a nitrogen-containing organic material to sequester metals from a liquid and optionally remove the metals from the liquid. At 202, a fluid containing metal species is contacted with a nitrogen-containing organic metal control material. The metal control material may include an HT material or an HA material, or both. The metal control material may be any of the metal control materials described herein, single molecule species, oligomer species, and/or polymer species, and may be structured according to any morphology convenient for making contact with the liquid. For example, the metal control material may be formed into particles, pellets, granules, powder, fibers, sheets, films, or any other convenient form. The metal control material may also be supported in any convenient way. For example, a sheet or film may be disposed on, or adhered to, a substrate, such as a pipe surface, plate, grid, mesh, sphere, fiber or fiber bundle, pellet, or particle. In another example, pellets, particles, granules, or powder may be disposed in a fixed or fluidized bed on a support that may be a perforated plate, mesh, stacked spheres, and the like. Any combination of the above may also be used.

Pellets, particles, granules, or powder forms may include particles of a base material coated with a metal control material. For example, particles of a structural polymer to which a metal control material will adhere may be coated with the metal control material. Structural polymers that may be used include polyolefins such as polyethylene and polypropylene, polystyrene, polyurethane, polyisocyanurate, acrylic polymers, polyesters, polyvinyl chloride, epoxy resins, polyamide, polyimide, fluoropolymer, and the like. The base material may be added to the reaction mixture before forming the metal control material, and may be present as the metal control material is formed in order to acquire a coating of the metal control material.

The liquid may be contacted with the metal control material in any convenient way. One way is to apply the liquid to a surface of a film of the metal control material. The film may be disposed on a support, such as a platform or a rim, and the liquid may be flowed, poured, sprayed, spin applied, ribbon applied, or otherwise applied to the film. In some embodiments, the film may be coated onto, or even adhered onto, a substrate. The metal control material may be immersed into the liquid, such as by dipping an article having a surface with the metal control material included therein into the liquid. The liquid may be flowed on or through the metal control material. The liquid may be sprayed on or through the metal control material. The liquid may be atomized into an aerosol that is contacted with the metal control material. The liquid may penetrate the metal control material, if desired.

The liquid may contact the metal control material at a phase interface, which may be a solid-liquid interface or a liquid-liquid interface. For example, an organic phase containing an HA or HT material dissolved or dispersed therein may contact a metal-containing aqueous phase at a liquid-liquid interface where the HA or HT material may contact metals in the aqueous liquid. In such an embodiment, the metal control material may be removed by decanting the organic phase, leaving an aqueous phase with a reduced metal content.

For a heterogeneous phase process as described above, metal control effectiveness may be improved by increasing the surface contact area between the two phases. In a solid-liquid system, particle size, surface area, and/or porosity may be adjusted to provide a desired contact surface. If porosity is desired, a metal control material as described herein may be foamed according to known procedures, and then the foam may be powdered or pulverized to form porous particles.

In another embodiment, the metal control material may be dispersed into the liquid. The metal control material may be in a powder form, and may be poured, or otherwise introduced, into the liquid. In some cases, the metal control material may be soluble in the liquid. If the metal control material is insoluble, or not substantially soluble, in the liquid, the metal control material may be removed from the liquid following an exposure period.

Without limitation to any specific mechanism, it is believed that metals cations ($M^{+p}$) in the liquid may associate with one or more nitrogen atoms in the metal control material to produce a complex according to formula (1):

(1)

wherein $A^-$ is an anion. The metals are adsorbed onto the metal control material at a surface that contacts the liquid at 204. The surface remains in contact with the liquid for a residence time selected to allow a desired amount of adsorption to occur. Typically, a residence time of 1 second to 60 minutes is used. The effective residence time may be less than the actual residence time if a portion of the metal control material has reached saturation. If the available active surface of the metal control material is reduced, the actual residence time may be increased to maintain an effective residence time within useful limits. In a continuous flow embodiment, the flow rate of liquid along, across, or through the metal control material may be slowed to increase the actual and effective residence time.

The liquid is separated from the metal control material at 206. The separation may be performed by removing the metal control material from the liquid, or by pouring the liquid out, in a batch process, or by stopping flow of the liquid and removing the metal control material in a flow process. It should be noted that multiple volumes or aliquots of liquid may be contacted with the metal control material before the metal control material is removed from service, although each individual aliquot or increment of flow is removed from contact with the metal control material after a certain time.

The metal control material is typically contacted with liquid over an extended time and may be used for multiple volumes of liquid. After a time, the metal control material may become saturated with metal, and may then exhibit reduced effectiveness. At 208, the metal control material may be regenerated to remove metal loading and restore the metal control effectiveness of the material. The metal control material may be contacted with a regeneration material, such as a basic liquid, to remove the metal. An exemplary basic liquid that may be used to regenerate the metal control material is a 1M aqueous solution of NaOH. Alternately, an aqueous solution of a strong acid may also be used to regenerate the metal control material. An acid solution having pH less than about 3 will disassemble and dissolve an HT or HA material, so an HA or HT material loaded with metal may be exposed to such a solution to remove the metal and some of the HA or HT material, leaving a cleaned surface of HA or HT material.

An HT material suitable for forming a film for detecting metals as described herein is a molecule, oligomer, or polymer that has a plurality of trivalent hexahydrotriazine groups having the structure and
a plurality of divalent bridging groups of formula (2):

(2)

wherein L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon, each starred bond of a given hexahydrotriazine group is covalently linked to a respective one of the divalent bridging groups, and each starred bond of a given bridging group is linked to a respective one of the hexahydrotriazine groups. In one embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$—*), and fluorenylidenyl:

For PHT materials with bridging groups of formula (2), the PHT may be represented by formula (3):

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (3) is a portion of a different hexahydrotriazine group.

The PHT may also be represented by the notation of formula (4):

wherein x' is moles, L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon. Each starred bond of a given hexahydrotriazine group of formula (4) is covalently linked to a respective one of the bridging groups. Additionally, each starred bond of a given bridging group of formula (2) is covalently linked to a respective one of the hexahydrotriazine groups. Polymer molecules may be capped or terminated by a capping group in place of a bridging group in formulas (3) and (4). Examples of capping groups include CH$_3$, hydrogen atoms, ether groups, thioether groups, and dimethyl amino groups.

The PHT or HT can be bound non-covalently to water and/or a solvent (e.g., by hydrogen bonds).

Exemplary non-limiting divalent bridging groups include:

and combinations thereof.

A suitable PHT material may be made by forming a first mixture comprising i) one or more monomers comprising two aromatic primary amine groups, ii) an optional diluent monomer comprising one aromatic primary amine group, iii) paraformaldehyde, formaldehyde, and/or another suitable aldehyde, and iv) a solvent, and heating the first mixture at a temperature of about 50° C. to about 300° C., preferably about 165° C. to about 280° C., thereby forming a second mixture comprising a polyhexahydrotriazine. The heating time at any of the above temperatures can be for about 1 minute to about 24 hours. Diamine monomers suitable for making such PHT materials may have the general structure $H_2N-Ar-L'-Ar-N-H_2$, where Ar denotes a benzene ring group and L' is defined as described above. Diluent monomers suitable for including in the reaction are typically primary monoamines $RNH_2$, where the group R bonded to nitrogen has a structure according to formula (5), formula (6), formula (7), and/or formula (8):

wherein W' is a monovalent radical selected from the group consisting of *—$N(R^1)(R^2)$, *—$OR^3$, —$SR^4$, wherein R', $R^2$, $R^3$, and $R^4$ are independent monovalent radicals comprising at least 1 carbon. The starred bonds in formulas (5), (6), (7), and (8) denote bonds with the nitrogen atom of the primary amine monomer. Non-limiting exemplary diluent groups include:

Diluent groups can be used singularly or in combination.

Non-limiting exemplary monomers comprising two primary aromatic amine groups include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

Non-limiting exemplary diluent monomers include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

(DPD)

(MOA)

(MTA)

(15DMN)

HT and HA metal control materials may be used to sequester or remove metals without first forming a film. Small molecules, oligomers, and gels of metal control materials may be added to a liquid to expose the metal control material to the liquid, and the metal control material and any adsorbed metal may then be removed from the liquid. In some cases, the metal control material may also be analyzed for UV absorption to detect a saturation point. If the material is saturated with metal, a regeneration process may be performed, as described above in connection with FIG. 2. Some of the metal control materials described above may be readily made into films. If a non-film material is used, other kinds of divalent bridging groups may be used to make the metal control material. It should be noted that many diamines will react with aldehydes such as formaldehyde to form metal control materials. Other exemplary diamines include polyetherdiamines such as polyethylene glycol diamine. Alkyl diamines such as hexane diamine will also react with formaldehyde to form metal control materials. The polyether and alkyl derived materials might not readily form films, but gels, oligomers, and small molecules may be formed that are usable as metal control materials.

Metal control may be performed in a continuous-flow mode, a batch mode, or a combination thereof. In the continuous-flow mode, a body of HT or HA metal control material may be exposed to a continuous flow of liquid to allow metals from the liquid to be adsorbed by the metal control material. A UV absorption analyzer may be disposed to detect metal loading of the metal control material, if desired. In a batch mode, a body of HT or HA metal control material, optionally disposed on a support, may be brought to a liquid to be processed and introduced directly in the liquid. Alternately, a fixed volume of the liquid may be introduced to the metal control material, for example by adding the liquid to a vessel containing the metal control material.

Figure 3A:
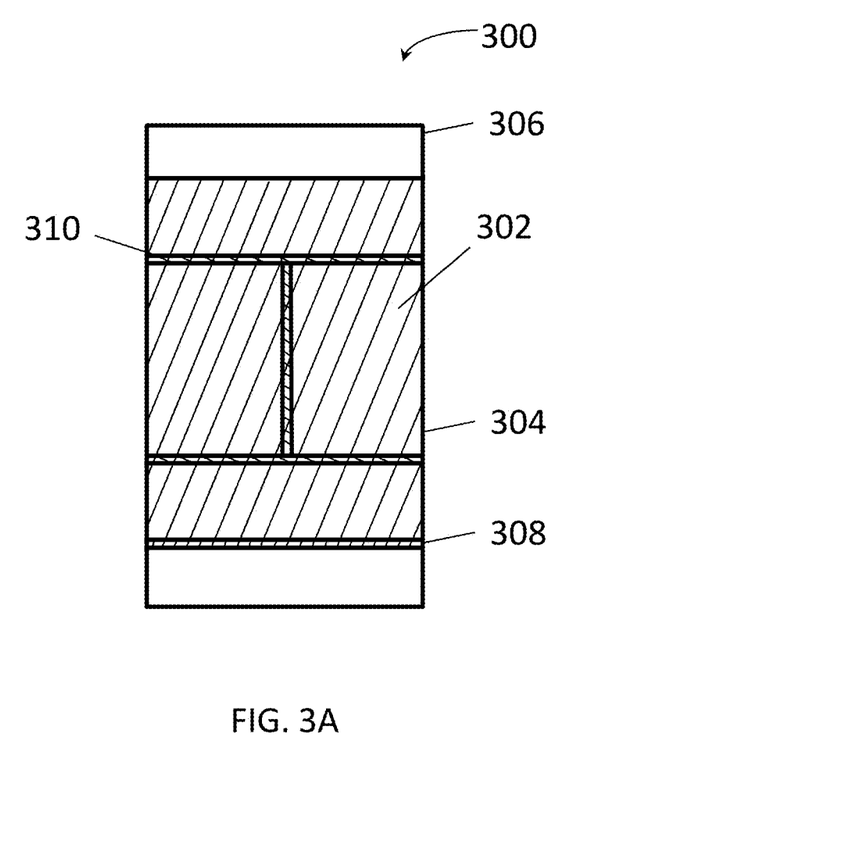
FIG. 3A is a schematic side-view of an apparatus for removing metals in a liquid according to another embodiment.

FIG. 3A is a schematic side view of an apparatus 300 for controlling metals in a liquid according to one embodiment. The apparatus 300 has a body 302 containing metal control material disposed in a housing 304. The housing 304 has a connection structure 306 for connecting the apparatus 300 to a source of liquid having metals to be controlled. The connection structure 306 may be a fitting or flange for connecting to a flow structure such as a pipe, tube, or other conduit. The housing 304 may have any convenient cross-sectional shape, such as circular, rectangular, or square.

The body 302 includes one or more of the metal control materials described herein, and may take the form of a powder, a film or collection of films, a fiber or collection of fibers, or a porous mass. In every form, the body 302 comprises one or more surfaces that has a metal control material for contacting a liquid.

The body 302 may be disposed on or in a support 308. For example, a powdered material may be supported on a perforated plate, mesh, sponge, or collection of spheres. A fiber material may be disposed linearly along a major axis of the apparatus 300, and may be terminated in a support plate or mass. In a collection of fibers, the fibers may all have the same length or a wide variety of lengths. The fibers may be parallel or non-parallel, and in an embodiment wherein the fibers are parallel and similar in length, the fibers may be curved or twisted, if desired, to provide a tortuous liquid flow path through the fibers.

In an embodiment wherein the metal control material is a powder, one or more flow structures 310 may be included intermittently within the body to prevent fluid channeling through the powder. The flow structures 310 may take the form of plates, meshes, or baffles that force fluid to flow along a non-linear path through the apparatus 300. As shown in FIG. 3A, the flow structures 310 may be oriented axially, that is along the major axis of the apparatus 300, transverse to the major axis, or at any desired angle between. The flow structures 310 may be flat or curved, and may be twisted to produce a rotating flow, such as a vortex flow, through the apparatus 300 to increase contact between the flowing liquid and the metal control material of the body 302. In one embodiment, flow structures may be arranged in an alternating interleaved pattern to provide a flow path through the body 302 that is parallel to a support 308 in a first direction through the body 302 to a wall of the housing 304, turns along the wall of the housing 304, and then parallel to the support 308 in a second direction opposite to the first direction through the body 302, for example in a boustrophedonic pattern.

The housing 304, connection structures 306, supports 308, and flow structures 310 may each be a structurally strong material such as metal or plastic, or combinations thereof. Any of the housing 304, connection structures 306, supports 308, and flow structures 310 may be lined or coated with a material, for example a fluoropolymer such as Teflon, to improve flow and/or reduce adhesion of material to structures of the apparatus 300.

The apparatus 300 may be used in a staged metal control configuration. Metal control may be performed in stages using a plurality of metal control modules such as the apparatus 300 in order to improve overall metal control results. A first stage may remove a first portion of the metal in a liquid, and a second stage may remove a second portion of the metal in the liquid. Any number of stages may be used, and piping may be provided to connect or bypass any particular stage, for example to allow the stage to be replaced if saturation is reached. In some embodiments, a recycle flow may be provided to perform multiple passes of the liquid through one or more stages.

Metal control materials described above may be soluble to some extent in the liquid being analyzed. The metal control materials may additionally be functionalized to affect solubility in various liquids. For example, a bridging group L' that has hydroxyl groups may be used to increase aqueous solubility or affinity. Alternately, or additionally, substituents of the aromatic rings in the diamine or monoamine reactants may include hydroxyl groups to increase aqueous solubility or affinity. Likewise, hydrocarbon bridging groups L' will tend to increase solubility or affinity for hydrocarbon liquids.

A related material that may be used to detect metals in liquids is a hemiaminal (HA) material. A polyhemiaminal (PHA) is a crosslinked polymer comprising i) a plurality of trivalent hemiaminal groups of formula (9):

covalently linked to ii) a plurality of bridging groups of formula (10):

wherein y' is 2 or 3, and K' is a divalent or trivalent radical comprising at least one 6-carbon aromatic ring. In formulas (9) and (10), starred bonds represent attachment points to other portions of the chemical structure. Each starred bond of a given hemiaminal group is covalently linked to a respective one of the bridging groups. Additionally, each starred bond of a given bridging group is covalently linked to a respective one of the hemiaminal groups.

As an example, a polyhemiaminal can be represented by formula (11):

In this instance, each K' is a trivalent radical (y'=3) comprising at least one 6-carbon aromatic ring. It should be understood that each nitrogen having two starred wavy bonds in formula (11) is a portion of a different hemiaminal group.

The structure of formula (11) can also be represented using the notation of formula (12):

(12)

wherein x' is moles and each bridging group K' is a trivalent radical (y'=3 in formula (10)) comprising at least one 6-carbon aromatic ring. It should be understood that each starred nitrogen bond of a given hemiaminal group of formula (12) is covalently linked to a respective one of the bridging groups K'. Additionally, each starred bond of a given bridging group K' of formula (12) is covalently linked to a respective one of the hemiaminal groups.

Non-limiting exemplary trivalent bridging groups for HA materials include:

The bridging groups can be used singularly or in combination.

Polyhemiaminals composed of divalent bridging groups K' can be represented herein by formula (13):

(13)

wherein K' is a divalent radical (y'=2 in formula (10)) comprising at least one 6-carbon aromatic ring. Each nitrogen having two starred wavy bonds in formula (13) is a portion of a different hemiaminal group.

More specific divalent bridging groups have the formula (14):

(13)

wherein L' is a divalent linking group selected from the group consisting of *—O—*, *—S—*, *—N(R')—*, *—N(H)—*, *—R''—*, and combinations thereof, wherein R' and R'' independently comprise at least 1 carbon. In an embodiment, R' and R'' are independently selected from the group consisting of methyl, ethyl, propyl, isopropyl, phenyl, and combinations thereof. Other L' groups include methylene (*—CH$_2$—*), isopropylidenyl (*—C(Me)$_2$—*), and fluorenylidenyl:

Polyhemiaminals composed of divalent bridging groups of formula (14) can be represented herein by formula (15):

(15)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. Each nitrogen having two starred wavy bonds in formula (15) is a portion of a different hemiaminal group.

The polyhemiaminal of formula (15) can also be represented by the notation of formula (16):

wherein x' is moles, and L' is a divalent linking group selected from the group consisting of *—O—*, *—S—*, *—N(R')—*, *—N(H)—*, *—R"—*, and combinations thereof, wherein R' and R" independently comprise at least 1 carbon. Each starred nitrogen bond of a given hemiaminal group of formula (16) is covalently linked to a respective one of the bridging groups. Additionally, each starred bond of a given bridging group of formula (16) is covalently linked to a respective one of the hemiaminal groups.

The hemiaminal groups can be bound non-covalently to water and/or a solvent. A non-limiting example is a hemiaminal group that is hydrogen bonded to two water molecules as shown in formula (17):

(17)

In some embodiments, a hemiaminal material may form a covalent network with water molecules that may be a polyhemiaminal hydrate (PHH). A PHA material of this form may be made, for example, by reaction of polyethylene glycol oligomers with paraformaldehyde. Such materials may be organogels in some cases.

Typical HT and HA polymers and oligomers, and PHH materials, as described herein may be disassembled in aqueous solutions. HT oligomers and polymers will disassemble into monomers and may dissolve in acid solutions having pH less than about 3, such as less than about 2.5, for example less than about 2. PHH materials may disassemble into monomers in neutral water. Such properties may be useful in regeneration of metal control material that has been saturated with metal due to use over an extended period of time. The metal control material may be washed with a

(16)

solution of appropriate pH to remove any portion of the metal control material saturated with metals and expose portions with lower, or zero, metal loading, thus regenerating the metal control material. In embodiments with a removable detection element, a used detection element may be replaced with a new detection element, and the used detection element may be subjected to a regeneration process including exposure to an aqueous wash solution of appropriate pH. Alternately, metals may be removed from the metal control materials described herein by exposure to a basic solution.

An HA material suitable for use according to the methods described herein may be made using the same groups of reactants as for the HT materials. The diluent monomers described above may also be used to make HA materials. A method of preparing a polyhemiaminal (PHA) comprising divalent bridging groups comprises forming a first mixture comprising i) a monomer comprising two or more primary aromatic amine groups, ii) an optional diluent monomer comprising one aromatic primary amine group, iii) paraformaldehyde, and iv) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups. The mole ratio of paraformaldehyde:total moles of primary aromatic amine groups (e.g., diamine monomer plus optional monoamine monomer) may be about 1:1 to about 1.25:1, based on one mole or equivalent of paraformaldehyde equal to 30 grams. The solvent can be any suitable solvent. Exemplary solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), and propylene glycol methyl ether acetate (PGMEA).

A PHT material may be prepared from a PHA material. The PHT can be prepared by heating a solution comprising the PHA at a temperature of at least 150° C., such as about 165° C. to about 280° C. or about 180° C. to about 220° C., for example at about 200° C. for about 1 minute to about 24 hours. Additionally, a mixed PHA/PHT copolymer may be made by partially converting a PHA material to a PHT material. A combination of low conversion temperature, for example about 150° C. to about 165° C., and short conversion time, for example about 1 minute to about 10 minutes, may be used to make a mixed PHA/PHT material.

An exemplary PHA material may be made by reaction of 4,4'-oxydianiline (ODA) with paraformaldehyde (PF). The product is a powder or solid plastic.

P-1

4,4'-Oxydianiline (ODA, 0.20 g, 1.0 mmol) and paraformaldehyde (PF, 0.15 g, 5.0 mmol, 5 equivalents (eq.)) were weighed out into a 2-Dram vial inside a $N_2$-filled glovebox. N-methylpyrrolidone (NMP, 6.2 g, 6.0 mL, 0.17 M) was added. The vial was capped but not sealed. The reaction mixture was removed from the glovebox, and heated in an oil bath at 50° C. for 24 hours (after approximately 0.75 hours, the polymer begins to precipitate). The polyhemiaminal P-1 was precipitated in acetone or water, filtered and collected to yield 0.22 g, >98% yield as a white solid.

A second exemplary PHA material may be prepared by reaction of 4,4'-methylenedianiline (MDA) with PF:

-continued

P-2

ODA was substituted with 4,4'-methylenedianiline (MDA) and a mole ratio of MDA to PF of 1:5 was used. Solid yield of 0.15 g, 69%, was an amorphous, insoluble off-white powder.

A PHT material may be prepared by reaction of ODA and PF, as follows:

P-4

P-4, a polyhexahydrotriazine, was prepared by reaction of 4,4'-oxydianiline (ODA) with paraformaldehyde (PF). ODA (0.20 g, 1.0 mmol) and PF (0.15 g, 5.0 mmol, 2.5 eq.) were weighed out into a 2-Dram vial inside a $N_2$-filled glovebox. NMP (6.2 g, 6.0 mL, 0.17 M) was added. The reaction mixture was removed from the glovebox, and heated in an oil bath at 200° C. for 3 hours (after approximately 0.25 hours, the polymer begins to gel in the NMP). The solution was allowed to cool to room temperature and the polymer was precipitated in 40 mL of acetone, allowed to soak for 12 hours, then filtered and dried in a vacuum oven overnight and collected to yield 0.21 g, 95% yield of P-4 as an off-white solid.

The metal control materials described herein may be included in a composite material that may be used as a metal control material in any of the embodiments described herein. Any desired blend material for a composite may be added to the reaction mixture of diamine and aldehyde prior to formation of a reaction product. For example, reactants may be mixed at a non-reacting temperature, for example less than about 50° C. for some embodiments, and a solid polymer material, for example a powder, a fiber aggregate, or a nanotube aggregate, may be added. The resulting combination may be mixed as the temperature is increased to form a reaction product. Any desired polymer may form a composite material with an HA, HT, or PHH material to provide selected properties. Carbon nanotubes may form a composite with HA, HT, or PHH materials. Polyolefin polymers may also form composite materials with a HA, HT, or PHH material. Such composite materials may be used as metal control materials for sequestering or removing metals from liquids in some embodiments.

While the foregoing is directed to example embodiments of the present disclosure, other and further embodiments may be devised without departing from the basic scope thereof, and the scope thereof is determined by the claims that follow.

What is claimed is:

1. An apparatus, comprising:
   a housing;
   a metal control material comprising a PHT material that is a polymerization product of an aldehyde and a primary diamine disposed in the housing, wherein the PHT material has a plurality of trivalent hexahydrotriazine groups having the structure and
   a plurality of divalent bridging groups having the structure each divalent bridging group bonded to two of the trivalent hexahydrotriazine groups, wherein L' is a divalent linking group;
   a connection structure coupled to the housing; and
   a support disposed in the housing and supporting the metal control material.

2. The apparatus of claim 1, further comprising a source of liquid fluidly coupled to the connection structure.

3. The apparatus of claim 1, further comprising a flow structure disposed within the metal control material.

* * * * *